United States Patent
Hummel et al.

(10) Patent No.: US 10,303,794 B2
(45) Date of Patent: May 28, 2019

(54) QUERY PERFORMANCE PREDICTION

(71) Applicant: International Business Machines Corporation, Armonk, NY (US)

(72) Inventors: Shay Hummel, Binyamina (IL); Ella Rabinovich, Haifa (IL); Haggai Roitman, Yokne'am Illit (IL)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 14/852,758

(22) Filed: Sep. 14, 2015

(65) Prior Publication Data

US 2017/0075893 A1    Mar. 16, 2017

(51) Int. Cl.
    *G06F 17/30* (2006.01)
(52) U.S. Cl.
    CPC ................. *G06F 17/3053* (2013.01)
(58) Field of Classification Search
    CPC ................................. G06F 17/30672
    See application file for complete search history.

(56) References Cited

U.S. PATENT DOCUMENTS

| | | | |
|---|---|---|---|
| 8,935,249 | B2 | 1/2015 | Traub et al. |
| 2010/0121840 | A1 | 5/2010 | Murdock et al. |
| 2014/0207746 | A1 | 7/2014 | Song et al. |

OTHER PUBLICATIONS

Borole, Snehal; "Survey on Algorithms Predicting Performance of Keyword Queries"; International Journal of Science and Research (IJSR); Dec. 2014; pp. 886-889; vol. 3 Issue 12.

Carmel et al.; "Query Performance Prediction for IR"; SIGIR Tutorial; Aug. 12, 2012; pp. 1-16; Portland, OR.

Collins-Thompson et al.; "Estimating Query Performance using Class Predictions"; SIGIR'09 Proceedings of the 32nd international ACM SIGIR conference on Research and development in information retrieval; Jul. 19, 2009; pp. 672-673; ACM.

Cummins et al.; "Improved Query Performance Prediction Using Standard Deviation"; SIGIR'11; Jul. 24-28, 2011; pp. 1-2; ACM.

Hauff et al.; "When is Query Performance Prediction Effective?"; SIGIR'09; Jul. 19-23, 2009; pp. 1-2; ACM.

(Continued)

*Primary Examiner* — William Spieler
(74) *Attorney, Agent, or Firm* — William H. Hartwell; Brian M. Restauro

(57) ABSTRACT

Machine logic that traces increases (or decreases) in query drift by performing the following steps: retrieving a first response list responding to a first query; retrieving a second response list responding to a second query, wherein the second query is based, at least in part, on a topic related to the first query; determining a set of scores for each of the first response list and the second response list, calculating a normalized query commitment ("NQC") for each of the first response list and the second response list; and responsive to determining that a ratio representing a relative difference between the NQC for the first response list and the NQC for the second response list is above a predetermined threshold, determining to use the second response list to respond to the first query.

20 Claims, 3 Drawing Sheets

(56) References Cited

OTHER PUBLICATIONS

Balasubramanian et al.; "Learning to Select Rankers"; SIGIR'10; Jul. 19-23, 2010; pp. 1-2; Geneva, Switzerland.

Bartlett, M. S.; "Properties of Sufficiency and Statistical Tests"; Proceedings of the Royal Society of London. Series A, Mathematical and Physical Sciences; May 18, 1937; pp. 268-282; vol. 160, No. 901; The Royal Society.

Shtok et al.; "Predicting Query Performance by Query-Drift Estimation"; ICTIR 2009, LNCS 5766; 2009; pp. 305-312; Springer-Verlag Berlin Heidelberg.

Shtok et al.; "Predicting Query Performance by Query-Drift Estimation"; ACM Transactions on Information Systems; May 2012; pp. 1-35; vol. 30, No. 2, Article 11; ACM.

QUERY PERFORMANCE PREDICTION

BACKGROUND

The present invention relates generally to the field of information retrieval, and more particularly to query performance prediction.

Information retrieval (IR) is the activity of obtaining information resources relevant to an information need from a collection of information resources. Searches can be based on metadata or on full-text (or other content-based) indexing. Automated information retrieval systems are used to reduce what has been called "information overload". Many universities and public libraries use IR systems to provide access to books, journals, and other documents. Web search engines are the most visible IR applications.

An information retrieval process begins when a user enters a query into the system. Queries are formal statements of information needs, for example search strings in web search engines. In information retrieval a query does not uniquely identify a single object in the collection. Instead, several objects may match the query, perhaps with different degrees of relevancy. An object is an entity that is represented by information in a database. User queries are matched against the database information. Depending on the application the data objects may be, for example, text documents, images, audio, mind maps, or videos. Often the documents themselves are not kept or stored directly in the IR system, but are instead represented in the system by document surrogates or metadata. Most IR systems compute a numeric score on how well each object in the database matches the query, and rank the objects according to this value. The top ranking objects are then shown to the user. The process may then be iterated if the user wishes to refine the query.

SUMMARY

According to an aspect of the present invention, there is a method, computer program product and/or computer system that performs the following steps (not necessarily in the following order): (i) retrieving, by one or more computer processors, a first response list including a plurality of documents responding to a first query; (ii) retrieving, by one or more computer processors, a second response list including a plurality of documents responding to a second query, wherein the second query is based, at least in part, on a topic related to the first query; (iii) determining, by one or more computer processors, a set of scores for each of the first response list and the second response list, wherein each score corresponds to a document in the plurality of documents for the respective the first response list or the second response list; (iv) calculating, by one or more computer processors, a normalized query commitment ("NQC") for each of the first response list and the second response list based on the respective first response list or the second response list's respective set of scores; and (v) responsive to determining that a ratio representing a relative difference between the NQC for the first response list and the NQC for the second response list is above a predetermined threshold, determining to use, by one or more computer processors, the second response list to respond to the first query.

DETAILED DESCRIPTION

Figure 1:
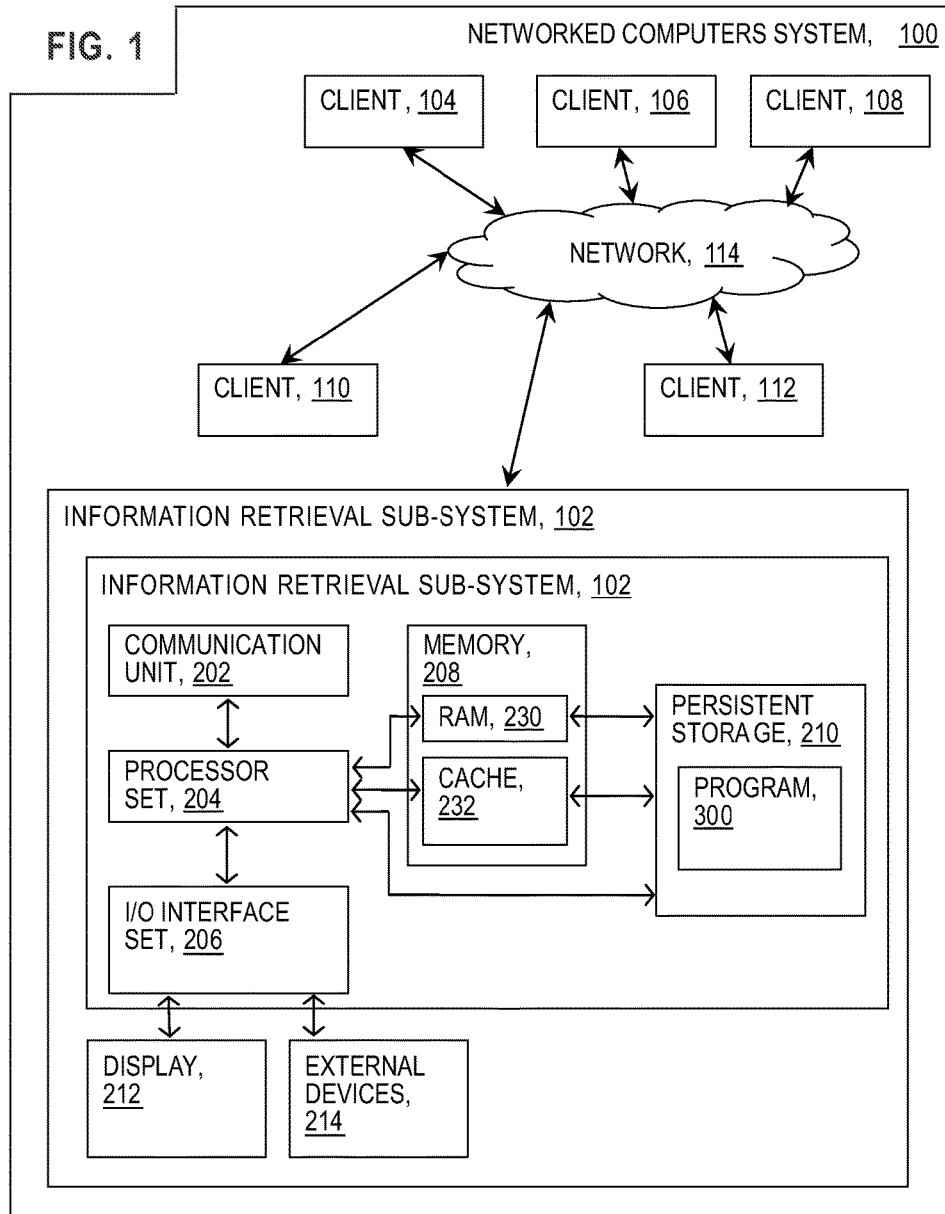
FIG. 1 is a block diagram view of a first embodiment of a system according to the present invention.

Query performance prediction methods can fail because of query drift, which occurs when non-relevant documents infiltrate the top results of a query or relevant results contain aspects irrelevant of the query's original intention. Embodiments of the present invention provide a what-if-analysis approach to query performance prediction, thereby providing a new measure for tracing significant reductions (or increases) in query-drift. Furthermore, such estimations may be then used to select effective response lists made by the same retrieval system (e.g., to improve search via re-ranking), weigh lists for fusion, and perform selective query expansion. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for the present invention will now be described in detail with reference to the Figures. FIG. 1 is a functional block diagram illustrating various portions of networked computers system 100, including: information retrieval sub-system 102; client sub-systems 104, 106, 108, 110, 112; communication network 114; information retrieval computer 200; communication unit 202; processor set 204; input/output (I/O) interface set 206; memory device 208; persistent storage device 210; display device 212; external device set 214; random access memory (RAM) devices 230; cache memory device 232; and program 300.

Information retrieval sub-system 102 is, in many respects, representative of the various computer sub-system(s) in the present invention. Accordingly, several portions of information retrieval sub-system 102 will now be discussed in the following paragraphs.

Information retrieval sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain functions that will be discussed in detail, below, in the Example Embodiment sub-section of this Detailed Description section.

Information retrieval sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Information retrieval sub-system 102 and information retrieval computer 200 are shown as block diagrams with many double arrows. These double arrows (no separate reference numerals) represent a communications fabric, which provides communications between various components of information retrieval sub-system 102 and information retrieval computer 200. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for information retrieval sub-system 102; and/or (ii) devices external to information retrieval sub-system 102 may be able to provide memory for information retrieval sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to information retrieval sub-system 102. In these examples, communications unit 202 includes one or more network interface cards. Communications unit 202 may provide communications through the use of either or both physical and wireless communications links. Any modules discussed herein may be downloaded to a persistent storage device (such as persistent storage device 210) through a communications unit (such as communications unit 202).

I/O interface set 206 allows for input and output of data with other devices that may be connected locally in data communication with information retrieval sub-system 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
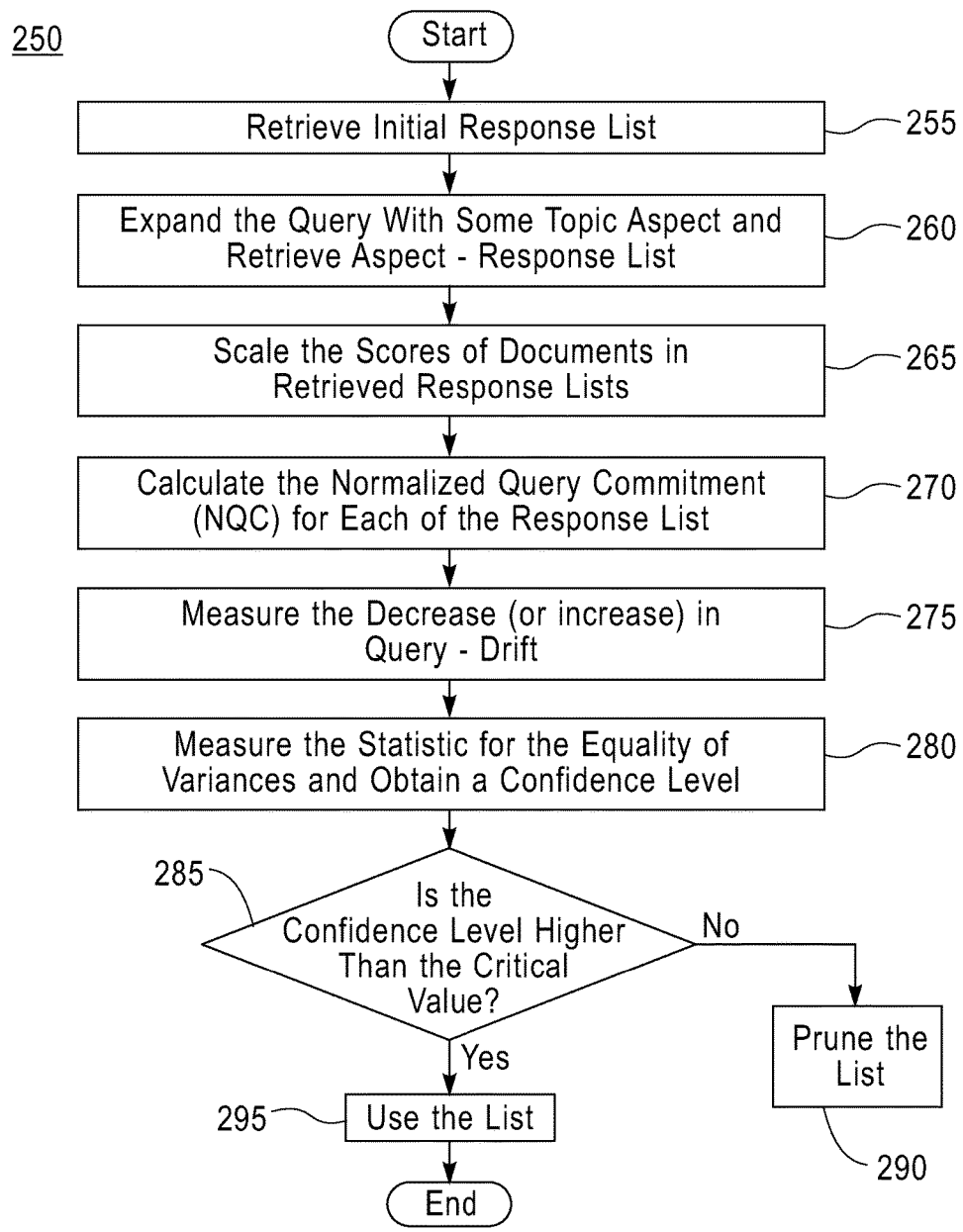
FIG. 2 is a flowchart showing a first embodiment method performed, at least in part, by the first embodiment system.
Figure 3:
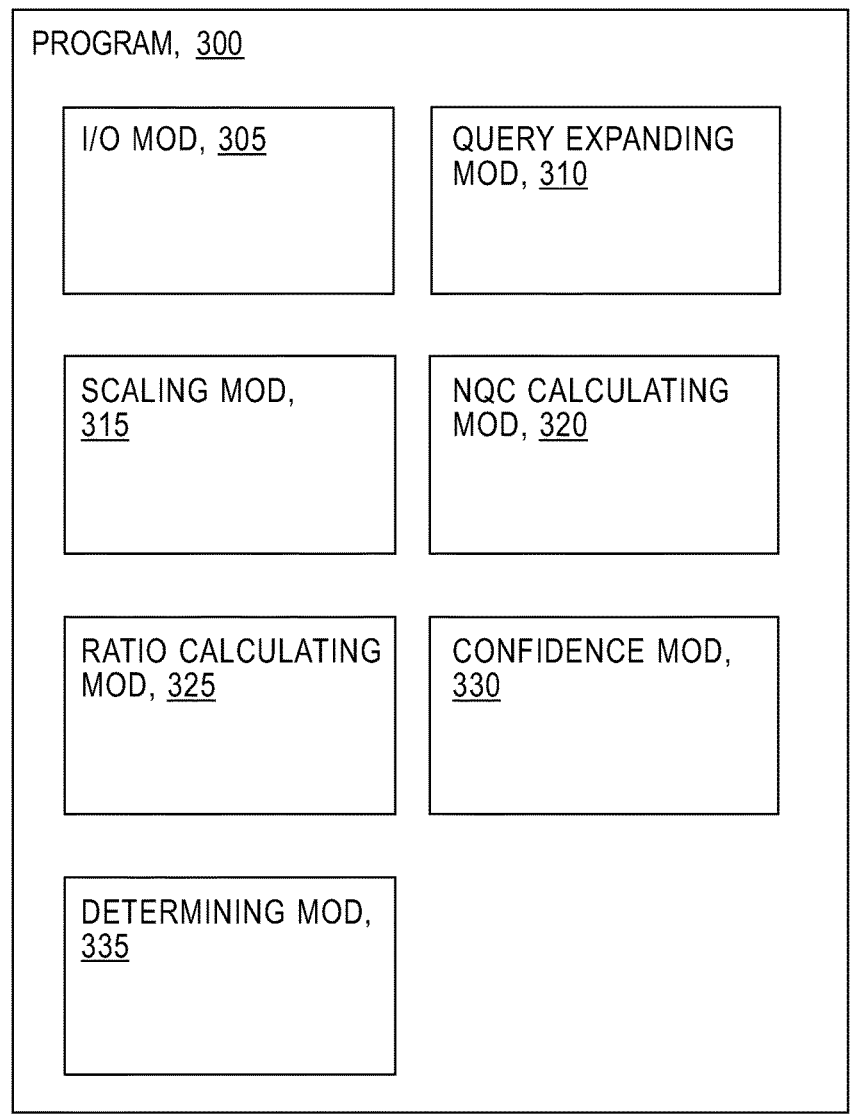
FIG. 3 is a block diagram showing a machine logic portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated processing modules will now be discussed, over the course of the following paragraphs, with extensive reference to FIG. 2 (for the method step blocks) and FIG. 3 (for the processing blocks). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Within the field of information retrieval, Query Performance Prediction (QPP) is the process of predicting the quality of a search (in terms of precision, mean average precision, etc.) before (i.e., pre-retrieval) and after (i.e. post-retrieval) a query is submitted to a search engine. Response lists and retrieval methods are examples of tools that are helpful in performing QPP, where a response list is the list retrieved by submitting a given query to some retrieval method that ranks documents in a given corpus. Query drift is a situation in which important aspects of the query are not adequately covered in the result list returned as response to the query. In other words, query drift is when the result list documents cover topic aspects that are irrelevant to the query.

In step 255, input/output ("I/O") module ("mod") 305 retrieves an initial response list. The initial response list is the result of the initial query. In this exemplary embodiment, the initial response list is used throughout this method as a reference list, to which other response lists will be compared. For example, when the quality of an aspect-response list is assessed, the initial response list is used as a reference list for comparison.

In step 260, query expanding mod 310 calculates the aspect-response for each topic aspect. In this exemplary embodiment, query expanding mod 310 expands the initial query with some topic aspect and retrieves an aspect-response list. A topic aspect encodes some possible facet of the main topic expressed in a query. In other words, a topic aspect is a more refined search topic used to generate the aspect-response list (a response list more specific to the topic aspect that is generated after submitting a topic aspect as a query). For a given query, query expanding mod 310 suggests topic aspects related to the query (i.e., sub-topics). Any method for obtaining such aspects can be employed at this step. For example, pseudo relevance feedback ("PRF") methods can be used to obtain an expanded version of the query. PRF is generally performed by assuming the top-k high ranked documents in the original list are relevant and extracting salient terms from those documents. A term (i.e., a single word, phrase, etc.) is salient if it appears in high frequency among those documents and with lower frequency in the background corpus. Examples of such methods are the Relevance Model ("RM"), Divergence Minimization Model ("DMM"), and the Generative Mixed Model ("GMM"). Other methods for obtaining important aspects may include topic models such as Latent Dirichlet Allocation ("LDA") and cluster based models.

In step 265, scaling mod 315 scales document scores in the retrieved response list. For each search query the items in the retrieved response list are each given a score based on their predicted accuracy to the search topic. An item with a higher score might denote a higher probability of relevance to a given query. The field of library and information science, has considered when documents (or document representations) retrieved from databases are relevant or non-relevant. For example, one major contributing factor in relevance scoring is the frequency of the user's search terms in matching metadata and full-text records. In this exemplary embodiment, the document scores of documents in the initial retrieved list are scaled. Scaling means to alter according to a standard or by degrees; adjusting in calculated amounts. For example, document scores might be scaled according to the average score to reduce the overall range of scores. Also in this exemplary embodiment, the document scores of any other retrieved list that is compared to the initial retrieved response list are scaled. For example, scaling mod 315 scales the document scores of documents in the aspect-response list.

In step 270, normalized query commitment ("NQC") mod 320 calculates the NQC for each of the response lists. The NQC is the standard deviation of the retrieval scores of the items (i.e., documents) of a given response list. In this exemplary embodiment, the NQC is calculated for each list (i.e., the initial response list and the aspect-response list) to determine which list is more relevant. The NQC can be used to assess the response quality of any retrieval method and the possibility of a query-drift that may exist within such response. Generally speaking, the higher the NQC measure (i.e., the measure of the standard deviation of the retrieval scores), the higher the predicted amount of query-drift, and therefore the lower the predicted quality of the associated response. In other words, the higher the spread of document scores with respect to the mean score of documents (the "centroid"), the better the ability of the centroid to detect misleader documents. Therefore, documents that are scored higher than the centroid have a better chance to correctly cover the information need (and therefore, be relevant). The documents that are scored lower than the centroid have a better chance to be determined as non-relevant.

In step 275, ratio calculating mod 325 measures the decrease (or increase) in query-drift, or the ratio (i.e., the relative difference in NQC between the aspect-response list and the initial response list). In this exemplary embodiment, ratio calculating mod 325 calculates the ratio, capturing the increase or decrease in query drift. A reduction in query drift means better quality information retrieval in the aspect-response list compared to the initial (reference) retrieved list. It should be appreciated that in this exemplary embodiment, a ratio value less than one (1) indicates an increase in query-drift and that a ratio value greater than one (1) indicates a decrease in query drift. Sub-section (iii) below discusses this step in greater detail.

In step 280, confidence mod 330 measures a statistic for the equality of variances and obtains a confidence level. This is a verification step to verify that the query drift is within the predetermined allowable range. In statistics, a confidence level refers to the percentage of all possible samples that can be expected to include the true population parameter. For example, suppose all possible samples were selected from the same population, and a confidence interval were computed for each sample. A 95% confidence level implies that 95% of the confidence intervals would include the true population parameter. In this exemplary embodiment, the Bartlett's Test for equality of variances is utilized. The Bartlett's Test statistic is explained in greater detail in sub-section (iii) below. It should be appreciated, however, that the instant invention is not limited to using only the Bartlett's Test, and that any other suitable method for measuring the statistic for the equality of variances may be used.

In step 285, determining mod 335 determines whether the confidence level is higher than a critical value. In statistical hypothesis testing, a critical value is the value corresponding to a given significance level. This cutoff value determines the boundary between those samples resulting in a test statistic that leads to rejecting the null hypothesis and those that lead to a decision not to reject the null hypothesis. If the calculated value from the statistical test is less than the critical value, then the null hypothesis has not been rejected. If the calculated statistic is outside of the critical value, the null hypothesis may be rejected at the pre-specified level of significance. Usually this also entails accepting some alternative hypothesis. Sub-section (iii) below discusses this step in greater detail.

If, in step 285, determining mod 335 determines that the confidence level is not higher than the critical value, then in step 290 determining mod 335 prunes the list. Generally, to prune means to rid or clear of anything superfluous or undesirable; to remove. In this exemplary embodiment, a list is pruned (i.e., not used) when its information retrieval quality is predicted to be relatively ineffective.

If, in step 285, determining mod 335 determines that the confidence level is higher than the critical value, then in step 295 determining mod 335 uses the list as the primary response list for future information retrieval operations. In this exemplary embodiment, a list is used because its information retrieval quality is predicted to be relatively effective.

III. FURTHER COMMENTS AND/OR EMBODIMENTS

Some embodiments of the present invention address the following problems: (i) selective query expansion; and (ii) ranker selection. Selective query expansion is determining whether to expand a given query. In other words, when given a list retrieved for its expanded version, determining whether to use the expanded list. Ranker selection is, when given two lists retrieved by two rankers for a given query, determining which list quality is better.

In one embodiment, let q denote a query (topic), capturing some information need $I_q$, submitted to some retrieval method M over a corpus of documents D. Let $D_q^{[k]} \subseteq D$ denote the result list of the k highest ranked documents returned by method M in response to q. Let $\text{Score}_q(d)$ and $r_{d;q}$ further denote the score of document $d \in D$ according to method M and its rank in $D_q^{[k]}$, respectively. For a given query q, let $A_q$ denote a set of topic aspects (or aspects for short); each aspect $\alpha \in A_q$ encodes some possible facet of the main topic expressed in q. A query aspect can be a single word, an n-gram, a phrase, or any other suitable alternative.

Referring still to the present embodiment, the aspect-response list is selected. The purpose of this step is to find a subset of aspects in $A_q$ to which the underline retrieval method M may provide "reasonable coverage. To this end, using a novel What-If Analysis (sensitivity analysis) approach to Query Performance Prediction (QPP), for each aspect $\alpha \in A_q$, the quality of its corresponding aspect-response $D_{q\vee\alpha}^{[k]}$ is being assessed, using the initial response $D_q^{[k]}$ as a reference list for comparison. For a given aspect $\alpha \in A_q$, let $P_{rsp}(\alpha)$ denote the predicted quality of aspect-response $D_{q\vee\alpha}^{[k]}$. $P_{rsp}(\alpha)$ may be effected by a possible query-drift that may "exist" within the response made by method M for the expanded query $q\vee\alpha$. Such drift might occur when given $q \vee \alpha$, aspect a has been overemphasized by method M in the expense of other aspects of query q. In this case, the corresponding aspect-response $D_{q\vee\alpha}^{[k]}$ is expected to provide lower coverage for the original query q due to a drift towards aspect $\alpha$. Hence, using aspect-response $D_{q\vee\alpha}^{[k]}$ in that case as a reference list for re-ranking documents in the initial list $D_q^{[k]}$ incurs a risk. Such an aspect, therefore, should be excluded from $A_q$. On the other hand, an aspect $\alpha \in A_q$ that is predicted to provide a "notable" reduction in query drift in method M's aspect-response $D_{q\vee\alpha}^{[k]}$ compared to $D_q^{[k]}$, when used to expand query q, is expected to be an aspect to which method M may provide a better coverage. Hence, $D_{q\vee\alpha}^{[k]}$ may serve as a "promising" reference list for re-ranking documents in the initial list $D_q^{[k]}$.

Referring still to the present embodiment, a baseline QPP method is used. Many known (or yet to be known) methods for estimating a given aspect-response quality may be used. For example, in one embodiment, a QPP module utilizes a Normalized Query Commitment (NQC) post-retrieval QPP method as a concrete predictor that may be considered as a possible implementation of $P_{rsp}(\alpha)$ for estimating a given aspect-response quality. The NQC measure provides an elegant connection between the retrieval quality of a given response made by method M and the possibility of a query-drift that may exist within such response. An attractive property of NQC, which makes it a good candidate for implementing $P_{rsp}(\alpha)$ in this work, is that, it can be used to assess the response quality of any retrieval method M with no prior assumptions about the exact retrieval model in mind. To this end, for a given query q, NQC only explores the scores $\text{Score}_q(d)$ that were assigned to documents in D by method M.

According to the NQC measure, the higher the predicted "amount" of query-drift, the lower the predicted quality of that response. The "amount" of query-drift is estimated by NQC to be in reverse proportion to the variance (i.e., spread) of the document scores, $\text{Score}_q(d)$, as determined by method M. For a given response $D_q^{[k]}$ made by method M (either directly for the original query q or its expanded version $q \vee \alpha$), let $S_q^2$ denote the sample score variance ("spread"), defined as follows:

$$S_q^2 \stackrel{def}{=} \frac{1}{k} \sum_{d \in D_q^{[k]}} [Score_q(d) - Score_q(D_q^{[k]})]^2 \qquad \text{Equation 1}$$

where $\text{Score}(D_q^{[k]})$ denotes the mean score of documents in $D_q^{[k]}$ (the "Centroid").

The NQC measure for a given response $D_q^{[k]}$ is then calculated as follows:

$$NQC(D_q^{[k]}) \stackrel{def}{=} \frac{\sqrt{S_q^2}}{Score_q(\mathcal{D})} \qquad \text{Equation 2}$$

where $\text{Score}_q(\mathcal{D})$ further denotes the (mean) collection score (according to method M) given query q.

According to this measure, the higher the spread of document scores $\text{Score}_q(d)$ with respect to $\text{Score}_q(D_q^{[k]})$ is, the better is the ability of the "centroid" $D_q^{[k]}$, represented by the mean score $\text{Score}_q(D_q^{[k]})$, to detect "misleader" documents. Hence, documents that are scored higher than $\text{Score}_q(D_q^{[k]})$ have a better chance to correctly cover the information need (and therefore, be relevant); and those that are scored lower, have a better chance to be determined as non-relevant.

Next, a way in which a more accurate aspect-response quality scoring can be derived based on the basic NQC measure will be discussed. Referring still to the present embodiment, the initial retrieved list $D_q^{[k]}$ may further surve as a reference list for aspect-response quality prediction. More specifically, utilizing a What-If Analysis approach, the NQC value of a given aspect-response $D_{q\vee\alpha}^{[k]}$ may be compared to the NQC value of $D_q^{[k]}$ to obtain a more accurate prediction based on the latter's predicted quality. The better the improvement in predicted quality is (i.e., $NQC(D_{q\vee\alpha}^{[k]}) > NQC(D_q^{[k]})$), the higher would be the predicted reduction in query drift within $D_{q\vee\alpha}^{[k]}$ compared to $D_q^{[k]}$. Such reduction on its hand, would imply that expanding query q with aspect $\alpha$ may result in a more effective retrieval. An "observed" reduction in query-drift may be attributed to the fact that aspect $\alpha$ may allow method M to better disambiguate between "important" and "less important" aspects of query q; and as a result, method M may provide better aspect-coverage. Hence, aspect-response list $D_{q\vee\alpha}^{[k]}$ may provide a more "valuable" feedback for re-ranking documents in the initial list $D_q^{[k]}$.

Aspect-response quality is now assumed to be proportional to the "magnitude" of the estimated reduction in query drift as a result of query q's expansion with a given aspect $\alpha \in A_q$. The decrease (or increase) in query-drift by expanding query q with a given aspect $\alpha \in A_q$ is measured using the following (quadratic) ratio $$\Delta(q; a) \stackrel{def}{=} \left[ \frac{NQC(D_{q\vee a}^{[k]})}{NQC(D_q^{[k]})} \right]^2.$$

Note that $\Delta(q; \alpha) > 1$ would imply on a decrease in query-drift (and $\Delta(q; \alpha) < 1$ the opposite).

Using the definition of the NQC measure in Eq. 2, the following equation can also be used:

$$\Delta(q; a) = \left[ \frac{S_{q\vee a}^2 / Score_{q\vee a}(\mathcal{D})^2}{S_q^2 / Score_q(\mathcal{D})^2} \right] \qquad \text{Equation 3}$$

Next, the scores of documents in the initial retrieved list $D_q^{[k]}$ (i.e., $\text{Score}_q(d)$) and that of the aspect-response list $D_{q\vee\alpha}^{[k]}$ (i.e., $\text{Score}_{q\vee\alpha}(d)$) are further scaled as follows:

$$Score'_q(d) \stackrel{def}{=} Score_q(d)/Score_q(\mathcal{D))$$
$$Score'_{q \vee a}(d) \stackrel{def}{=} Score_{q \vee a}(d)/Score_{q \vee a}(\mathcal{D})$$

Equation 4

Using the identity $$Var\left(\frac{1}{c} \cdot X\right) \stackrel{def}{=} \frac{1}{c^2} Var(X),$$

where $Var(\cdot)$, $c$ and $X$ denote the variance measure, a constant and a random variable, respectively; the following equation can also be used:

$$\Delta(q; a) = \left[\frac{S'^2_{q \vee a}}{S'^2_q}\right]$$

Equation 5 where $S'^2_q$ and $S'^2_{qVa}$ denote the sample variances using the corresponding scaled scores of Eq. 4.

An initial proposal for improving $P_{rsp}(\alpha)$ may be, therefore, to take its value to be $\Delta(q; \alpha)$. Yet, it should be noted that $\Delta(q; \alpha) < 1$ is true whenever an increase in query-drift is predicted to occur by expanding query q with some aspect $\alpha$. As a consequence, there is a lower chance that this aspect would provide a good indication for retrieval quality. Hence, in such a case, $D_{qV\alpha}^{[k]}$ should be discarded.

In order to minimize such a risk due to possible query-drift, a pruned version for $P_{rsp}(\alpha)$ is further suggested based on Eq. 5 as follows. According to the proposed pruning "rule", an aspect-response $D_{qV\alpha}^{[k]}$ should be discarded whenever either one of the following two conditions holds:
1. $\Delta(q; \alpha) \leq 1$
2. $\Delta(q; \alpha) > 1$, but the improvement in variance is not (statistically) significant.

The first condition is easy to verify. Assuming that the first condition does not hold, the second condition is verified using a statistical test, with the null hypothesis considered as $\Delta(q; \alpha)=1$. For this purpose, the Bartlett's Test for equality of variances is utilized as follows.

The Bartlett's Test statistic for equality of variances of two samples is given by:

$$x^2 \stackrel{def}{=} \frac{(k+k'-2)\ln(S'^2_p) - [(k-1)\ln(S'^2_p) + (k'-1)\ln(S'^2_{q \vee a})]}{1 + \frac{1}{3}\left[\frac{1}{k-1} + \frac{1}{k'-1} - \frac{1}{k+k'-2}\right]}$$

Equation 6 where k' is the actual size (i.e., number of documents) of aspect-response $D_{qV\alpha}^{[k]}$ and $S'^2_p$ is the pooled estimate for the variance, defined as follows:

$$S'^2_p \stackrel{def}{=} \frac{1}{k+k'-2}[(k-1)S'^2_q + (k'-1)S'^2_{q \vee a}]$$

Equation 7

It should be appreciated that for a given aspect, it is possible that the number of documents retrieved by expanding the original query with that aspect will be less than k.

The $x^2$ test statistic has approximately a Chi-Square distribution with one degree of freedom (further denoted as $x_1^2$). Thus, the null hypothesis may be rejected (with a $(1-(1-\rho))\%$ confidence; $\rho \in [0,1]$) if $x^2 > x_{1,\rho}^2$, where $x_{1,\rho}^2$ is the upper tail $\rho$-critical value for the $x_1^2$ distribution.

Finally, the pruned version of $P_{rsp}(\alpha)$ is defined as follows:

$$P_{rsp}(a) \stackrel{def}{=} \begin{cases} x^2, & \Delta(q; a) > 1 \wedge x^2 > x_{1,\rho}^2 \\ 0, & \text{else} \end{cases}$$

Equation 8

Therefore, given aspect $\alpha \in A_q$, aspect-response $D_{qV\alpha}^{[k]}$ is selected for the next step if $P_{rsp}(\alpha) > 0$; otherwise, aspect $\alpha$ is excluded from $A_q$. Using this pruned version of $P_{rsp}(\alpha)$ significantly outperforms several other alternatives, including applying the original NQC measure directly on the aspect-response list.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The invention claimed is:

1. A method comprising:
   retrieving, by one or more computer processors, a first response list including a plurality of documents responding to a first query;
   retrieving, by one or more computer processors, a second response list including a plurality of documents responding to a second query, wherein said second query is based, at least in part, on a topic related to said first query;
   improving a search retrieval system by reducing query drift and increasing accuracy of search results comprising the first response list and the second response list generated by the improved search retrieval system by:
   determining, by one or more computer processors, a set of scores for each of said first response list and said second response list, wherein each score corresponds to a document in said plurality of documents for the respective said first response list or said second response list;

calculating, by one or more computer processors, a normalized query commitment ("NQC") for each of said first response list and said second response list based on the respective said first response list or said second response list's respective set of scores;

responsive to determining that a ratio representing a relative difference between the NQC for said first response list and the NQC for said second response list is above a predetermined threshold, filtering the search results by determining to use, by one or more computer processors, said second response list to respond to said first query; and returning as a result, by one or more processors, the second response list as a search result that satisfies the first query.

2. The method of claim 1, further comprising:
responsive to determining that the ratio representing the relative difference between the NQC for said first response list and an NQC for a third response list is below or equal to the predetermined threshold, determining, by one or more computer processors, not to use said third response list to respond to said first query.

3. The method of claim 1, further comprising:
prior to calculating the NQC for each of said response lists, scaling said set of scores for each of said response lists.

4. The method of claim 1, wherein determining to use said second response list is further responsive to determining a confidence level for the ratio.

5. The method of claim 4, wherein determining the confidence level for the ratio comprises:
measuring, by one or more computer processors, a statistic for the equality of variances for each of said first response list and said second response list.

6. The method of claim 4, further comprising:
determining, by one or more computer processors, that said confidence level is higher than a predetermined critical value; and
determining, by one or more computer processors, to use said second response list to respond to said first query.

7. The method of claim 4, further comprising:
determining, by one or more computer processors, that said confidence level is not higher than said predetermined critical value; and
determining, by one or more computer processors, not to use said second response list to respond to said first query.

8. A computer program product comprising:
a computer readable storage medium and program instructions stored on the computer readable storage medium, the program instructions comprising:
program instructions to retrieve a first response list including a plurality of documents responding to a first query;
program instructions to retrieve a second response list including a plurality of documents responding to a second query, wherein said second query is based, at least in part, on a topic related to said first query;
program instructions to improve a search retrieval system by reducing query drift and increasing accuracy of search results comprising the first response list and the second response list generated by the improved search retrieval system by:

program instructions to determine a set of scores for each of said first response list and said second response list, wherein each score corresponds to a document in said plurality of documents for the respective said first response list or said second response list;

program instructions to calculate a normalized query commitment ("NQC") for each of said first response list and said second response list based on the respective said first response list or said second response list's respective set of scores; and program instructions to, responsive to determining that a ratio representing a relative difference between the NQC for said first response list and the NQC for said second response list is above a predetermined threshold, filter the search results by determining to use said second response list to respond to said first query; and program instructions to return as a result the second response list as a search result that satisfies the first query.

9. The computer program product of claim 8, further comprising:
program instructions to, responsive to determining that the ratio representing the relative difference between the NQC for said first response list and an NQC for a third response list is below or equal to the predetermined threshold, determine not to use said third response list to respond to said first query.

10. The computer program product of claim 8, further comprising:
program instructions to, prior to calculating the NQC for each of said response lists, scale said set of scores for each of said response lists.

11. The computer program product of claim 8, wherein the program instructions to determine to use said second response list is further responsive to program instructions to determine a confidence level for the ratio.

12. The computer program product of claim 11, wherein determining the confidence level for the ratio comprises:
program instructions to measure a statistic for the equality of variances for each of said first response list and said second response list.

13. The computer program product of claim 11, further comprising:
program instructions to determine that said confidence level is higher than a predetermined critical value; and
program instructions to determine to use said second response list to respond to said first query.

14. The computer program product of claim 11, further comprising:
program instructions to determine that said confidence level is not higher than said predetermined critical value; and
program instructions to determine not to use said second response list to respond to said first query.

15. A computer system comprising:
one or more computer processors;
one or more computer readable storage media;
program instructions stored on the computer readable storage media for execution by at least one of the one or more computer processors, the program instructions comprising:
program instructions to retrieve a first response list including a plurality of documents responding to a first query;

program instructions to retrieve a second response list including a plurality of documents responding to a second query, wherein said second query is based, at least in part, on a topic related to said first query;

program instructions to improve a search retrieval system by reducing query drift and increasing accuracy of search results comprising the first response list and the second response list generated by the improved search retrieval system by:

program instructions to determine a set of scores for each of said first response list and said second response list, wherein each score corresponds to a document in said plurality of documents for the respective said first response list or said second response list;

program instructions to calculate a normalized query commitment ("NQC") for each of said first response list and said second response list based on the respective said first response list or said second response list's respective set of scores; and program instructions to, responsive to determining that a ratio representing a relative difference between the NQC for said first response list and the NQC for said second response list is above a predetermined threshold, filter the search results by determining to use said second response list to respond to said first query; and program instructions to return as a result the second response list as a search result that satisfies the first query.

16. The computer system of claim 15, further comprising:
program instructions to, responsive to determining that the ratio representing the relative difference between the NQC for said first response list and an NQC for a third response list is below or equal to the predetermined threshold, determine not to use said third response list to respond to said first query.

17. The computer system of claim 15, wherein the program instructions to determine to use said second response list is further responsive to program instructions to determine a confidence level for the ratio.

18. The computer system of claim 17, wherein determining the confidence level for the ratio comprises:
program instructions to measure a statistic for the equality of variances for each of said first response list and said second response list.

19. The computer system of claim 17, further comprising:
program instructions to determine that said confidence level is higher than a predetermined critical value; and
program instructions to determine to use said second response list to respond to said first query.

20. The computer system of claim 17, further comprising:
program instructions to determine that said confidence level is not higher than said predetermined critical value; and
program instructions to determine not to use said second response list to respond to said first query.

* * * * *